United States Patent [19]

Rowe et al.

[11] Patent Number: 4,618,350
[45] Date of Patent: Oct. 21, 1986

[54] GAS-LIQUID CONTACTING

[75] Inventors: Frederick Rowe, Middlesbrough; Peter N. Jackson, Stockton-on-Tees, both of England

[73] Assignee: Imperial Chemical Industries Plc., London, England

[21] Appl. No.: 479,912

[22] Filed: Mar. 28, 1983

Related U.S. Application Data

[63] Continuation of Ser. No. 331,386, Dec. 16, 1981, abandoned.

[30] Foreign Application Priority Data

Dec. 17, 1980 [GB] United Kingdom ............... 8040397

[51] Int. Cl.⁴ .............................................. B01D 47/00
[52] U.S. Cl. ......................................... 55/92; 55/227; 55/228; 55/238; 55/261; 55/338; 55/242; 261/79 A; 422/129
[58] Field of Search ............ 55/92, 227, 228, 235–239, 55/242, 261, 338; 261/79 A; 422/129

[56] References Cited

U.S. PATENT DOCUMENTS

| | | | |
|---|---|---|---|
| 1,758,983 | 5/1930 | Seymore | 55/235 |
| 2,575,359 | 11/1951 | Ortgies | 55/236 |
| 2,857,979 | 10/1958 | Van Dijck | 55/459 R |
| 3,243,941 | 4/1966 | Peterson | 55/204 |
| 3,323,290 | 6/1967 | Stern | 261/79 A |
| 3,324,632 | 6/1967 | Berneike et al. | 55/236 |
| 3,710,554 | 1/1973 | Brookman | 55/236 |

Primary Examiner—Bernard Nozick
Attorney, Agent, or Firm—Cushman, Darby & Cushman

[57] ABSTRACT

A method and apparatus are described for contacting a gas with a liquid by injecting gas at high tangential velocity into a contacting zone so as to form a large centrifugal force in the zone and allowing the gas to transit across a liquid inlet in the zone so that liquid is drawn into countercurrent contact with the gas. One embodiment of the apparatus consists of a closed vessel (1) having an internal baffle (5), and inlet (3) for gas or vapor injection and a gas or vapor outlet (4). The internal baffle defines an upper gas-liquid contacting zone and a lower storage zone for liquid (8). Liquid is drawn into the contacting zone through the liquid inlet dippipe (7) and after contact with the gas can flow back to the storage zone via the peripheral gap (6).

3 Claims, 9 Drawing Figures

GAS-LIQUID CONTACTING

This is a continuation of application Ser. No. 331,386, filed Dec. 16, 1981 now abandoned.

The present invention relates to a process and apparatus for rapid and intimate mixing of a liquid stream with a gas or vapour stream and their subsequent separation into liquid and gas or vapour stream.

Gas-liquid contacting devices are used in a wide variety of industrial applications. Some such devices are used only for gas absorption, whereas others are used as chemical reactors in which the dissolving gas reacts in the liquid phase. If the rate of this reaction is fast, the overall rate-limiting step can be the mass transfer rate. In other applications a cold liquid phase may be used to abstract heat from a hot gas or vapour stream, or a liquid stream may be used to scrub solid particulate material from suspension in a gas or vapour stream.

In all these applications rapid and efficient heat or mass transfer depends on achieving an intimate mixture of the gas and liquid with a large surface area of liquid exposed to the gas, then coalescing the dispersed phase (liquid or gas) to a single stream and separating it from the continuous phase. Numerous devices have been developed to achieve this sequence of dispersion and recovery, some of them very complex. Of the simpler ones the best-known are (1) devices for bubbling the gas as a dispersed phase through the liquid, using multi-orifice "spargers" or porous sinters to produce small bubbles of high surface area. Such devices suffer disadvantages in that a high pressure drop is required to force the gas through the small orifices, the orifices are easily blocked by any impurities in the gas stream; corrosive gases or liquids can markedly affect the orifice size, leading to severe maintenance problems and devices of this type may suffer from severe foaming problems, leading to great difficulty in separating the phases after contacting.

(2) Devices for spraying the liquid as a dispersed phase through the gas using nozzles designed to produce small droplets of high surface area. The disadvantages of such systems include high pressure drop in the liquid stream; the critical dependence on correct performance of the nozzles, which can be blocked easily by contaminants or corroded in reactive media with rapid deterioration in their efficiency; the danger of liquid carry-over with the gas stream, which increases as the droplet size diminishes and efficiency of contacting increases. This latter problem makes necessary a more complicated phase-separation stage, often a succession of cyclones and demisters, adding greatly to the cost of the device and to the over-all volume of the equipment.

More complex developments of the same principles as hereinbefore described for contacting two phases include vessels with stirrers, agitators or baffles designed to increase the relative rates of movement between the two phases, thus increasing the rate of mass or heat transfer by diffusion across the large interphase surfaces created by dispersion of one phase in the other. Such complexities add to the cost, to the problems of maintenance and, since they often involve moving parts, to the problems of sealing the mixing vessel if the device is to be used at pressures above or below ambient or if it is to be used with toxic fluids.

According to the present invention a method for contacting a gas or vapour and a liquid comprises injecting a gas or vapour tangentially into a gas-liquid contacting zone said contacting zone having an inlet for gas or vapour and an exit and being of such shape and dimensions that said injected gas or vapour follows a substantially spiral path between said inlet and exit at a tangential velocity which is sufficient to create a large centrifugal force field within said zone and wherein along said substantially spiral path said gas or vapour transits at least one inlet to said zone for liquid supplied from liquid supply means located externally to said zone, pressure conditions within said contacting zone being so controlled that liquid from said liquid supply means is drawn through said inlet for liquid thereby to contact the gas or vapour.

Injection of the gas or vapour at a high tangential velocity ensures that the momentum of the gas or vapour stream provides the energy for the creation of a high gas-liquid interphase area by breaking down the liquid stream into small droplets. The large centrifugal force field ensures that the relatively dense liquid droplets spiral outwards, counter-current to the inwardly-spiralling gas or vapour stream, thereby ensuring a high rate of diffusional mass or heat transfer between the gas or vapour and the fine droplets of liquid. At the outer boundaries of the gas-liquid contacting zone the outwardly-spiralling liquid droplets coalesce into a continuous liquid phase which may be recycled either to the said liquid supply means located externally to the contacting zone or to a separate liquid product collection means, as required.

The tangential velocity of the gas or vapour stream must be sufficiently great to create a centrifugal force field at the inlet or inlets for liquid which is at least several times as great as that exerted by the terrestrial gravitational field. As the centrifugal force (F) is a function of both the tangential velocity (V) and the radius of curvature (r) of the gas or vapour following its spiral path, according to the formula $F=(V^2/r)$, for a given force F the actual velocity will depend on the size of the device.

The present invention also includes apparatus for gas-liquid contacting which contains no moving parts.

Accordingly the present invention further provides gas or vapour/liquid contacting apparatus which comprises a closed chamber provided with an internal wall or baffle whereby the walls of the closed chamber and the internal wall or baffle define adjacent gas-liquid contacting and liquid storage zones separated by said internal wall or baffle;

conduit means to allow liquid to flow from said gas-liquid contacting zone to said liquid storage zone;

a gas or vapour inlet located at or near a point on the periphery of the gas-liquid contacting zone;

a liquid supply conduit located in said internal wall or baffle and connecting said contacting and storage zones; and an outlet from the contacting zone for gas or vapour.

Preferably, the internal wall or baffle is a discontinuous internal wall or baffle by which we mean that the internal wall or baffle should not totally shut off the contacting zone from the storage zone. The internal wall may extend right across the closed chamber from wall to wall thereof but must then in this preferred embodiment, be provided with slots or orifices forming the said conduit means to enable contacted liquid to flow back from the contacting zone to the storage zone. In an alternative arrangment, the internal wall may be of slightly smaller diameter than the internal diameter of the closed chamber thereby providing a peripheral slot around the circumference of the closed chamber, which slot serves as the said conduit means.

The said gas or vapour inlet is so located and arranged as to cause the injected gas or vapour to have a high tangential velocity and to adopt a spiral path of travel within the said contacting zone. The said liquid supply conduit is so located and arranged that the liquid passing through it is injected into the spiral path of the said gas or vapour in the said contacting zone.

Embodiments of the present invention are further described hereinafter with reference to the accompanying drawings in which FIG. 1 is a schematic vertical sectional view of a gas-liquid contactor embodying the principles of the present invention;

In the drawings, like features are referred to by like reference numerals.

Figure 1:
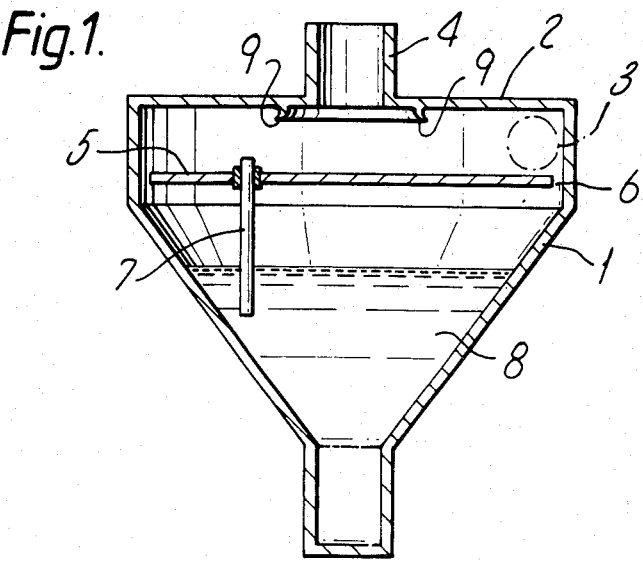
Figure 2:
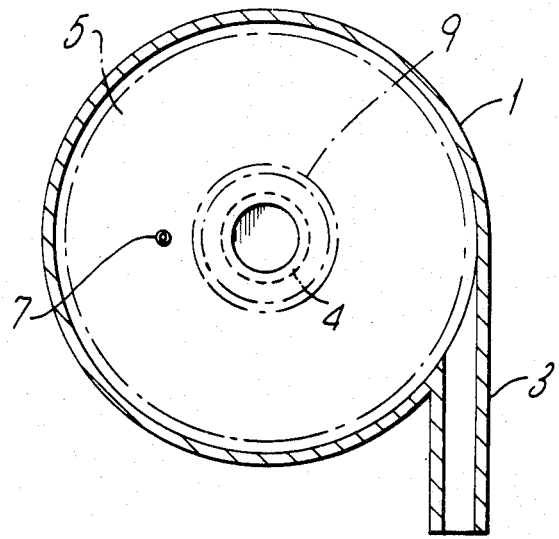
FIG. 2 is a horizontal sectional view of the contactor of FIG. 1.

Referring to FIGS. 1 and 2, a gas-liquid contacting vessel 1 consists of a vessel which is cylindrical in its upper portion and which has a flat top 2. The cylindrical upper portion is fitted with a tangential inlet pipe 3 for gas and an axial gas discharge pipe 4. A circular plate 5 of slightly smaller diameter than the internal diameter of a the cylindrical upper portion of vessel 1 is positioned within vessel 1 at a distance from the flat top 2 which is slightly greater than the diameter of the tangential inlet pipe 3. The plate 5 and the inner wall of vessel 1 thereby define a circumferential slot 6. (For clarity the supports for the plate 5 are not shown in the drawing). The circular plate 5 carries a dip pipe 7 positioned, in the embodiment shown in FIG. 1, approximately midway between the central axis of plate 5 and its circumference. The upper end of dip pipe 7 protrudes into the flat pill-box shaped cavity (the gas-liquid contacting zone) defined by plate 5 and the cylindrical upper portion of vessel 1 to a distance approximating to half the depth of the cavity. Dip pipe 7 is sufficiently long to allow its lower end to dop below the surface of liquid 8 contained in the lower portion of vessel 1. Attached to the underside of flat top 2 is a circular wall 9, of a shape similar to a breakwater, whose purpose is to prevent liquid droplets which strike the inner surface of flat top 2 from reaching the exit 4. When the apparatus is in use, any liquid droplets striking the inner surface of top 2 lose their momentum by wall friction and thus, instead of spiralling outwards, are dragged inwards, towards exit 4, by the gas. However, to reach exit 4 the droplets have to climb over the wall 9. As the droplets reach the lower point of the wall, they are dislodged by the rapidly moving gas stream and become free droplets again, to be accelerated outwards by centrifugal force. The wall 9 is preferably located at a point intermediate the exit 4 and dip pipe 7 and its height is preferably of the order of 1/10 of the distance between flat top 2 and plate 5.

The apparatus is mounted substantially horizontally. Thus the surface of liquid 8, when at rest, lies approximately parallel to the lower surface of plate 5.

In operation, gas or vapour from an external source (not shown) is injected through the tangential inlet pipe 3 at a sufficiently high velocity as to create an intense centrifugal field within the cylindrical upper portion of vessel 1. The gas travels in a spiral path through the cavity (gas-liquid contacting zone) defined by the upper portion of vessel 1 and the plate 5, creating an intense centrifugal field in this cavity, and leaving the vessel through outlet pipe 4. As there is a pressure drop between inlet pipe 3 and exit pipe 4, and as pressure at the circumference of plate 5 (approximately equal to the pressure at the inlet 3 to vessel 1) and in the space below plate 5 is equalised through the circumferential slot 6, the pressure at the upper end of dip pipe 7 is lower than the pressure on the surface of liquid 8. As a result liquid will rise in the dip pipe 7 until it flows into the upper cavity of vessel 1. There the liquid emerging from pipe 7 is dispersed into small droplets by the high shear forces generated by the rapidly moving gas stream, these droplets initially being accelerated in the direction of motion of the injected gas in its spiral path through the cavity. However, because of the greater density of the liquid droplets, the high centrifugal field in the cavity causes them to spiral outwards towards the circumferential wall of the cavity and thereby countercurrently to the inwardly spiralling gas stream. This countercurrent motion causes a high rate of mass or heat transfer between gas and liquid. At the circumferential wall of the cavity the droplets are rapidly coalesced into a single liquid phase which flows through the circumferential slot 6 into the lower portion of vessel 1, where it drains back into the bulk of the liquid 8.

So far as the dimensions and proportions of the device are concerned, the Applicants emphasise that these are not limited to those shown in the drawings. The optimum size and shape of the apparatus will depend to some extent on the physical properties of the gases and liquids which are to be contacted. In general, the upper portion of the vessel 1, defined by the position of plate 5, ie the gas-liquid contacting zone, will have a diameter greater than its depth ie it will be shaped substantially like a pill-box. As there is a pressure drop between gas inlet pipe 3 and exit pipe 4, with an increase in gas volume, exit pipe 4 should usually be of somewhat greater cross-sectional area than pipe 3. On the other hand, if the contacting liquid is to be used, for example, to dissolve a substantial proportion of the gas flowing through the apparatus, the pipe 4 need not be larger than pipe 3.

The gas inlet pipe 3 may be of circular cross-section, as shown in the drawings, or it may be of square or rectangular cross-section. If desired, a plurality of gas inlet pipes spaced around the periphery of the vessel may be employed, each of said pipes directing the gas tangentially into the upper portion of the vessel.

The form of the slot 6 is also not limited to that shown in the drawings. If desired, it can be discontinuous with uniformly spaced bridging pieces connecting plate 5 with the circumferential wall of vessel 1 and acting as supports for plate 5. Alternatively, the slot 6 may comprise a plurality of holes of appropriate size drilled around the circumference of plate 5, said plate being then a tight fit within vessel 1. In general, the total cross-section are of the "slot" (whatever its form) should be not less than that of dip-pipe 7, as liquid drawn up through the dip-pipe has to flow back through the slot.

The shape and size of the lower portion of vessel 1 (the liquid storage zone) are immaterial to the princple of the invention and they may be varied, as required to suit the various applications of the apparatus of the invention.

The dip-pipe 7 may take various forms apart from that shown in the accompanying drawings. For example, a plurality of dip-pipes, spaced around the plate 5 either approximately equiradially or not, may be used. If desired the upper outlet of dip-pipe 7 may terminate in a nozzle of suitable design, thereby assisting dispersion of the liquid. Optionally, the upper end of dip-pipe 7 (or the nozzle attached thereto) may be bent at an angle to direct the emergent flow of liquid into a path more nearly parallel to the path of the spiralling gas stream. If desired, the upper end of the dip-pipe may be shaped in the form of a jet-nozzle to accelerate the liquid into the spiralling gas stream, thereby permitting a smaller protrusion of the dip-pipe into the upper portion of the vessel and thus reducing the disturbance to the spiral flow of gas.

Figure 3:
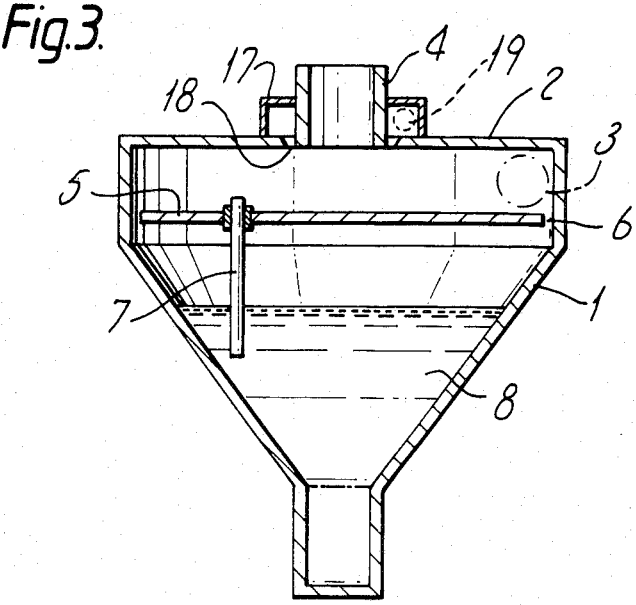
FIG. 3 is a side view of a second embodiment showing a second tangentially positioned gas inlet pipe.

Modifications to the embodiment of the invention shown in FIGS. 1 and 2 are illustrated with reference to FIGS. 3 and 4. These modifications enable a more complete separation of gas and liquid phases to be achieved after the contacting operation, should this be necessary. Referring to FIG. 3 a pill-box shaped container 17 supports the axial gas discharge pipe 4 so that the latter can be separated from the flat top 2 of the contacting vessel 1 by a narrow annular space 18. The container 17 is fitted with a tangential gas inlet pipe 19. The inlet pipe 19 is so positioned that, in use, gas supplied through it enters contacting vessel 1 through the annulus 18 with the same direction of swirl as the gas already in vessel 1.

In use, a second gas stream is supplied to container 17 through inlet 19 and thence, via annulus 18, to container 1, as described. In this way, liquid droplets are prevented from being carried across the underside of flat top 2 and into the exit gas discharged through pipe 4. This embodiment therefore fulfils the same function as the breakwater shaped wall 9 (FIG. 1) and if desired a similar wall 9 may be incorporated into the embodiment illustrated in FIG. 3.

The second gas stream fed through inlet 19 may comprise, for example, a recycle stream of the gas which has left pipe 4 after treatment or any other gas that could be tolerated in the product, for example a diluent gas, a quenching gas, depending on what end-use is envisaged for the product gas.

Figure 4:
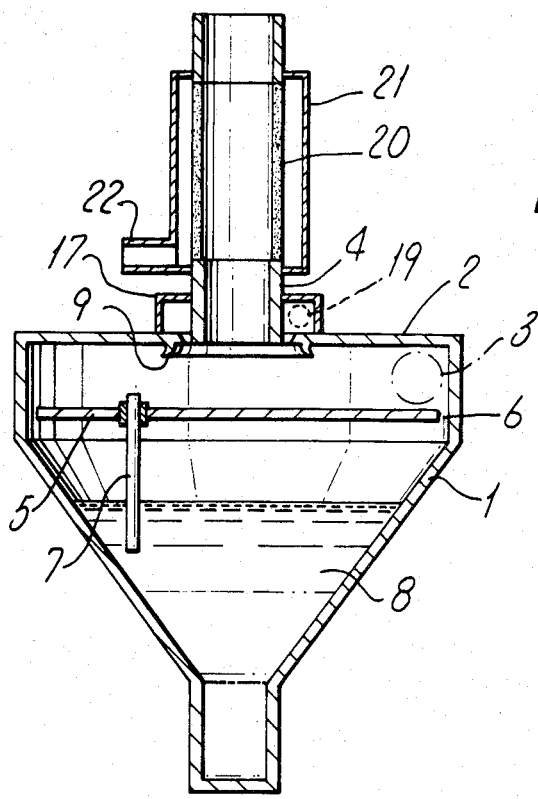
FIG. 4 is a side view of a third embodiment showing the exit pipe made of a porous material.

The modification illustrated in FIG. 4 consists of an extension of exit pipe 4 which is made of suitable porous material 20 and which is surrounded by a cylindrical casing 21 with an exit pipe 22 connected to a suitable extraction pump (not shown). FIG. 4 also illustrates additionally the breakwater-shaped wall 9 and the secondary gas injection device 17/18/19 illustrated in FIG. 3. These two additional features are optional to the modification shown in FIG. 4 and both of them, or only one, or neither may be used in association with the FIG. 4 modification, as desired.

In use, any liquid which is carried over into exit pipe 4 is firmly held against the inside wall of the pipe by a centrifugal force which has been generated in the upper portion of vessel 1, as hereinbefore described. Thus, such liquid will be sucked through the porous section 20 by the pump connected to exit 22. If desired, the liquid can be recycled to the lower portion of vessel 1 together with any gas which is sucked through the porous section. The porous material may be any suitable such material, for example sintered metal or porous ceramic or a mesh cylinder lined with filter paper or cloth. The latter is especially useful for scrubbing particulate materials out of the gas stream.

Figure 5:
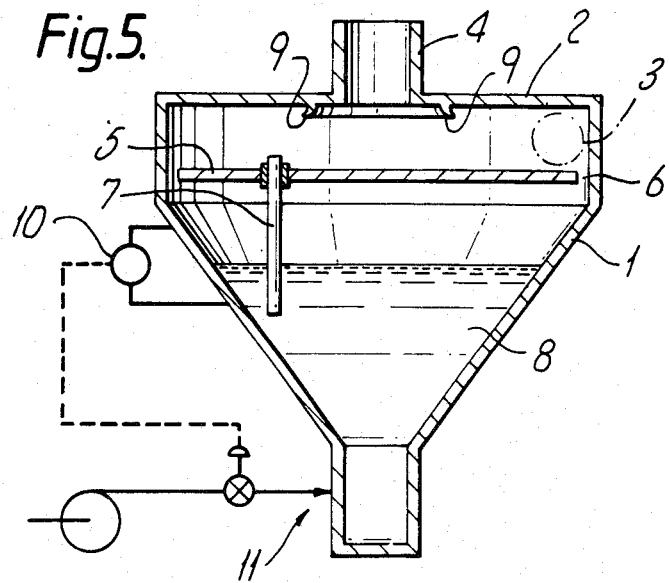
FIG. 5 is a side view of a fourth embodiment having a level detecting means for fluid supply.

An application of the method and apparatus of this invention to the vapourising of a liquid into a gas stream is illustrated with reference to FIG. 5. A level control device 10 is fitted to the lower portion of vessel 1 and is connected to a supply of make-up liquid indicated generally by 11, thus ensuring that the level of liquid does not fall below the lower end of dip-pipe 7.

Figure 6:
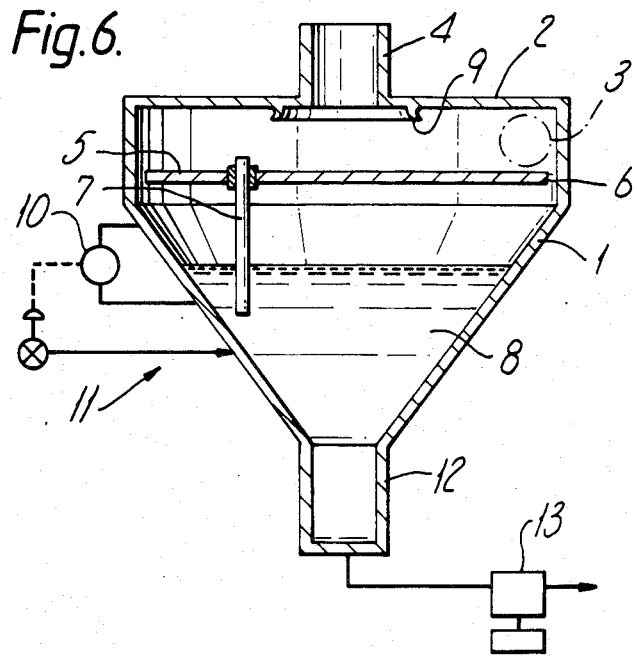
FIG. 6 shows a fifth embodiment provided with a sludge pump 13 connected to the lower portion of the vessel.

FIG. 6 illustrates application of the invention to the scrubbing of gas with liquid to wash out entrained particulate materials. The lower portion of vessel 1 is used as a settling tank with a sump 12 in which a sludge pump 13 is employed to remove the sludge and the level of liquid 8 is maintained with make-up liquid under level control.

Figure 7:
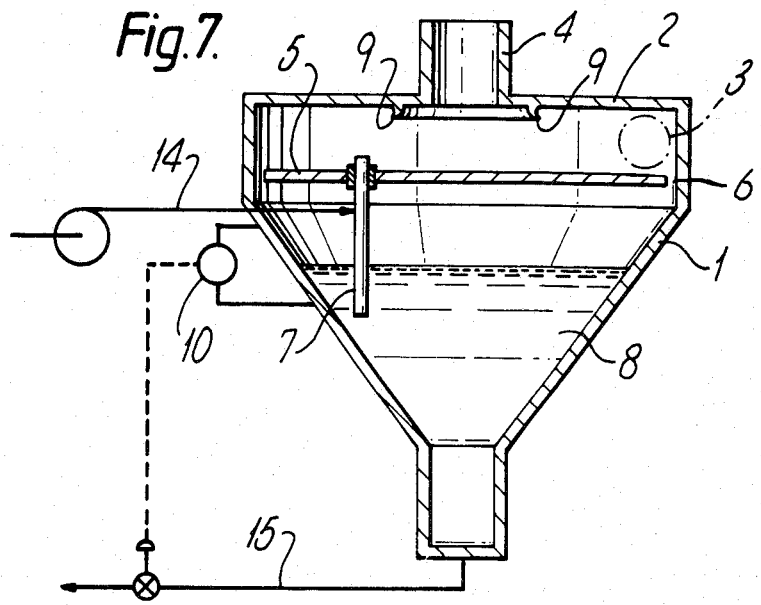
FIG. 7 shows a sixth embodiment having a liquid supply connected to the dip pipe.

FIG. 7 illustrates a simple application of the application as a gas-liquid reactor operating as a fully-stirred pot. Fresh reactant liquid is injected from line 14 as a side-stream into dip-pipe 7 where it is diluted with recirculating liquid 8 before being drawn into the gas-liquid contacting zone of vessel 1. Product liquid is drawn off under level control from the bottom of vessel 1 by line 15. Dependent on the quantity of reactant liquid and the amount of recycle required, this simple system may be readily adapted to suit the requirements of the reaction. For example, ingress of recycle liquid at the bottom of dip-pipe 7 can be prevented completely to give a once through reactor with no recycle. If the quantity of reactant liquid required is large, it can be injected into a dip-pipe which is blocked at the bottom, and other open dip-pipes can be provided to supply the recycle either at the same or at different radii in the contact zone.

Figure 8:
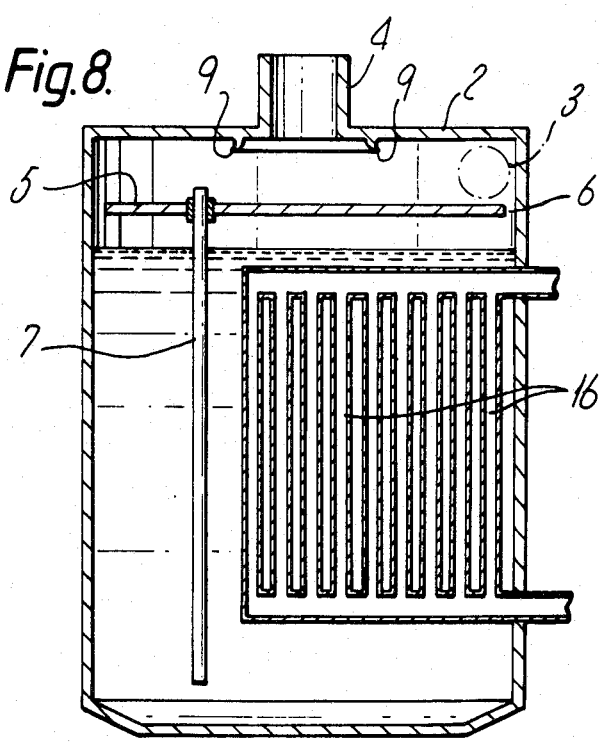
FIG. 8 shows a seventh embodiment having a heat exchanger to cool the liquid supply.

FIG. 8 illustrates application of the method and apparatus of the invention to abstract heat from a hot gas stream. The lower portion of vessel 1 is enlarged to accommodate cooling coils 16 and the dip-pipe 7 is lengthened to collect liquid after it has passed around these cooling coils. The cooled liquid passes up dip-pipe 7 and abstracts heat from the spiralling hot gas stream injected through inlet 3. The hot liquid flows through slot 6 to rejoin the bulk liquid 8.

Refinements such as baffles to direct the flow of liquid efficiently around the cooling coils, a make-up pump and level control to balance possible liquid losses by evaporation, and a purge system to control any contamination of liquid 8 by components of the hot gas, have been omitted for clarity from the drawing.

Figure 9:
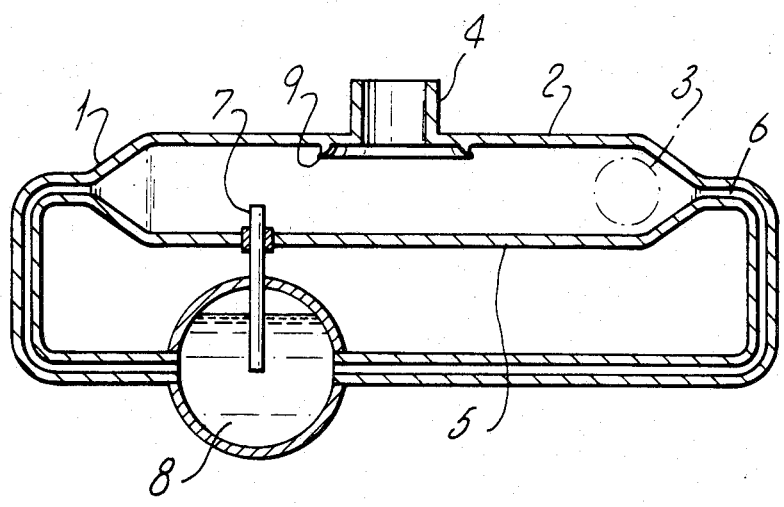
FIG. 9 shows an eighth embodiment having the supply container separate from the contact chamber.

FIG. 9 illustrates another embodiment of the method and apparatus of the invention in which the conduit means 6, allowing liquid to flow between the gas-liquid contacting zone and the liquid storage zone 8, is defined by the flat top 2 and the plate 5. Although, for clarity, this embodiment is shown in FIG. 9 in a substantially horizontal position, it can be used in non-horizontal positions provided that the lower end of dip-pipe 7 (as shown in FIG. 9) remains immersed in the liquid 8.

We claim:

1. A method for contacting a gas or vapour and a liquid which comprises injecting a gas or vapour tangentially into a gas-liquid contacting zone said contacting zone having an inlet for gas or vapour and an exit and being of such shape and dimensions that said injected gas or vapour follows a substantially flat spiral path between said inlet and exit at a tangential velocity which is sufficient to create a large centrifugal force field within said zone and wherein along said substantially flat spiral path said gas or vapour transits at least one inlet to said zone for liquid supplied from liquid supply means located externally to said zone, said liquid inlet being located at a point which is displaced away from the center of the contacting zone and pressure conditions within said contacting zone being so controlled that liquid from said liquid supply means is drawn through said liquid inlet for liquid thereby to counter currently contact the gas or vapour, and injecting a second gas or vapour into said contacting zone, said second gas or vapour being injected with a direction of swirl which is the same as that of the gas or vapour already within said contacting zone and at a point adjacent to said gas or vapour exit, whereby to restrain passage of liquid through said exit.

2. A method as claimed in claim 1 in which after contacting said gas or vapour said liquid is removed from the gas-liquid contacting zone and recycled either to said liquid supply means or to liquid product collection means.

3. A method as in claim 1 wherein the liquid is removed from the gas-liquid contacting zone at the periphery thereof for recycle to the liquid supply means.

* * * * *